Nov. 14, 1933.　　　M. CALLEJO　　　1,935,201

LAVATORY FIXTURE

Filed Jan. 27, 1933　　　3 Sheets-Sheet 1

INVENTOR
MODESTO CALLEJO
BY
Edward L. Mueller
ATTORNEY

Nov. 14, 1933. M. CALLEJO 1,935,201
LAVATORY FIXTURE
Filed Jan. 27, 1933  3 Sheets-Sheet 2
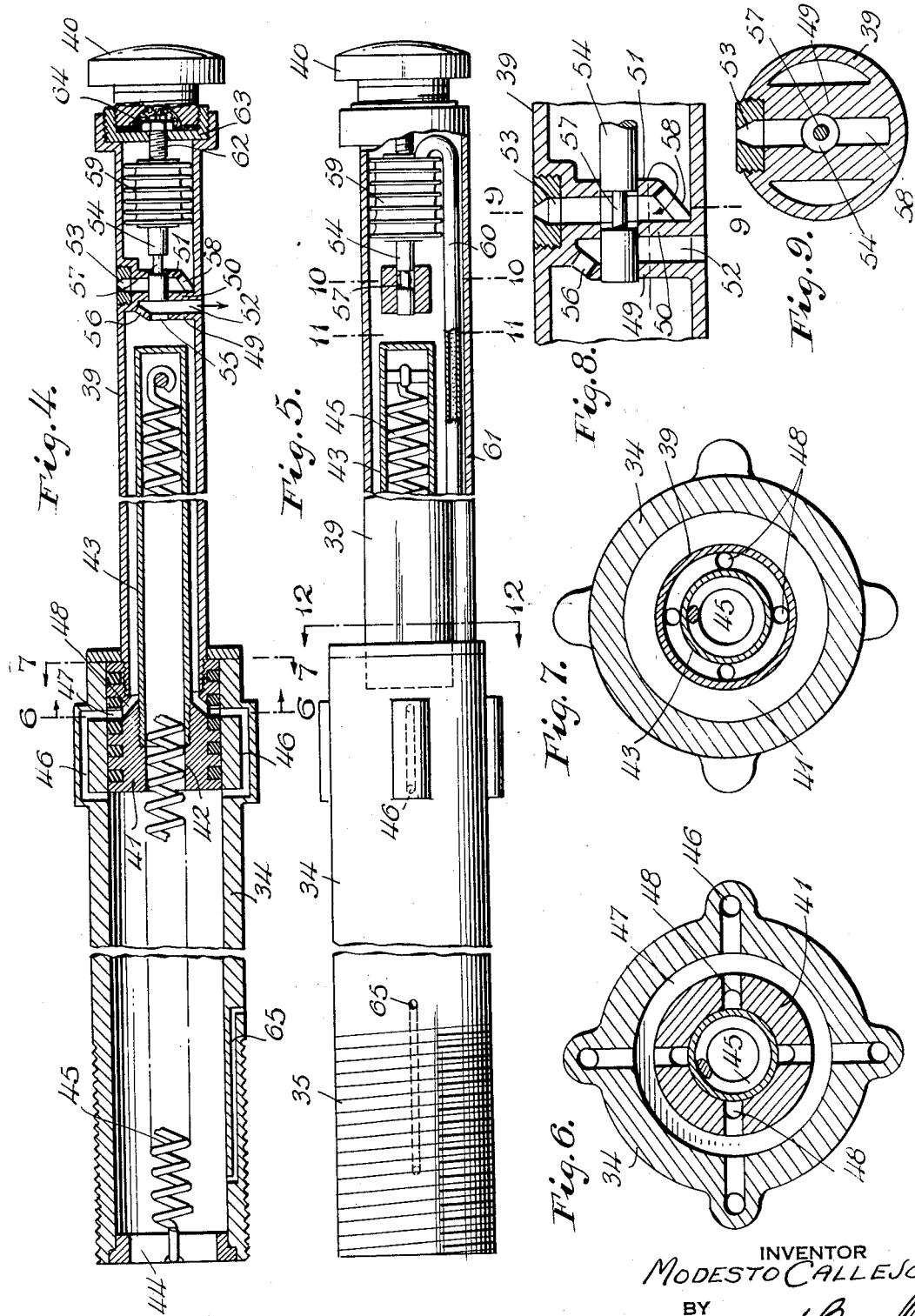
INVENTOR
MODESTO CALLEJO
BY
ATTORNEY Nov. 14, 1933.   M. CALLEJO   1,935,201
LAVATORY FIXTURE
Filed Jan. 27, 1933   3 Sheets-Sheet 3
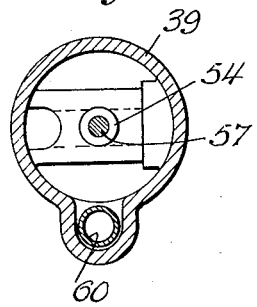
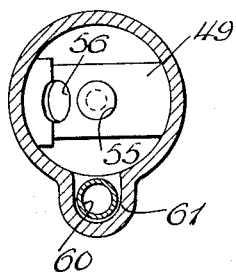
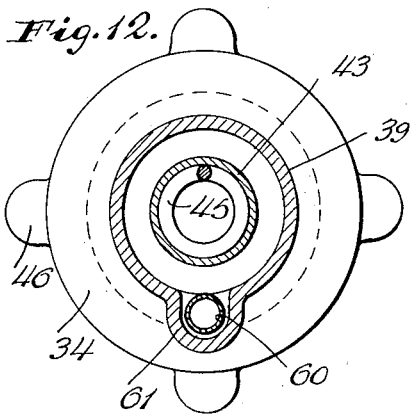
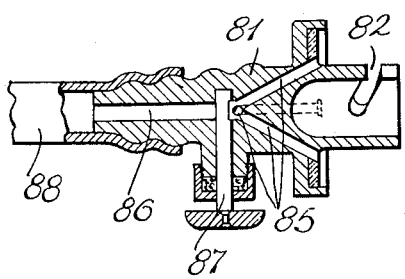
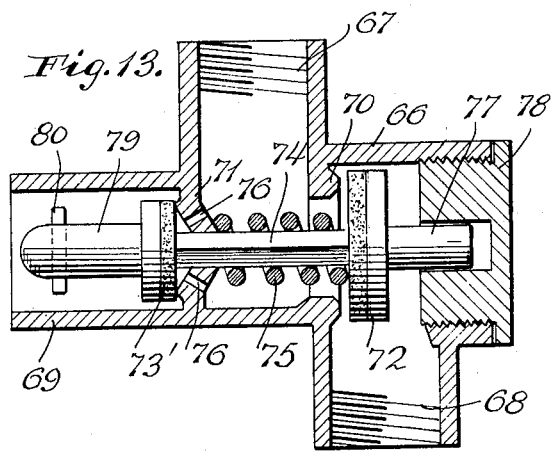
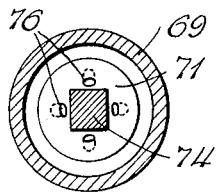
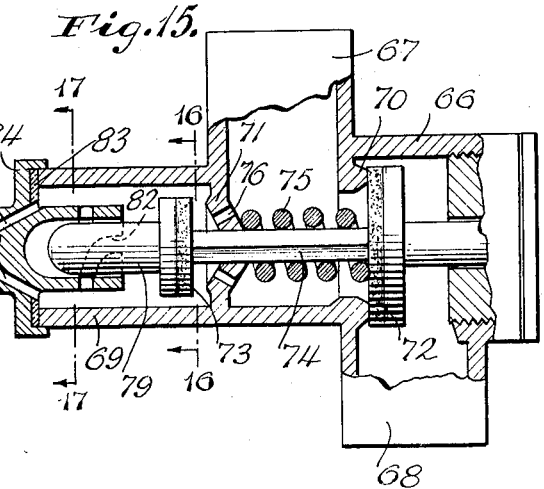
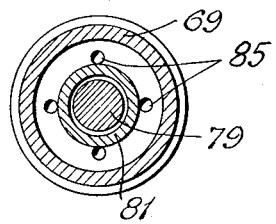
INVENTOR
MODESTO CALLEJO
BY
Edward L. Mueller
ATTORNEY Patented Nov. 14, 1933

1,935,201

UNITED STATES PATENT OFFICE 1,935,201

LAVATORY FIXTURE

Modesto Callejo, Bronx, N. Y.

Application January 27, 1933. Serial No. 653,809

15 Claims. (Cl. 4—7)

This invention relates to improvements in lavatory fixtures and has particular reference to a water-supply control system and bidet attachment for toilet bowls of the type disclosed in my United States Letters Patent #1,855,008, granted April 19, 1932.

In said patent, there is disclosed and claimed a bidet having a nozzle which is moved from an inoperative to an operative position by the flow of the water supply, and in which means are provided to prevent said flow from passing out of the nozzle until the operative position thereof is reached. There is also shown in said patent a mixing valve for controlling the supply of hot and cold water to the bidet so that the temperature of the water may be regulated to some extent. However, with a control such as shown, the temperature of the water cannot be determined until some of it has flowed out of the nozzle.

It is proposed, in accordance with the present invention, to so control the water supply through the bidet that none of it will be directed upwardly in the bowl until the mixture of hot and cold water constituting said supply has attained a predetermined temperature. To this end, use is preferably made of a valve under the control of a thermostatic device which is influenced by the temperature of the water to operate said valve to divert the water supply into the bowl until the temperature of the water has reached the desired point.

The invention further contemplates a valve device located in the water supply system for the toilet bowl and through which said supply passes when the bidet is in use, and which may be controlled by the connection of a nozzle to the device for diverting the supply from the bidet to a douching apparatus or the like.

The inventive idea involved is capable of receiving a variety of mechanical expressions, one of which, for purposes of illustration, is shown in the accompanying drawings, wherein:

Figure 4 is an enlarged longitudinal section through the bidet with the nozzle in its projected or operative position.

Figure 5 is a fragmentary longitudinal section taken at right angles to Figure 4.

Figures 6 and 7 are transverse sections taken on the lines 6—6 and 7—7, respectively, of Figure 4.

Figure 8 is an enlarged longitudinal section taken through a portion of the bidet nozzle and showing the control valve in position to permit the water supply to flow upwardly in the normal direction from the nozzle, that is, when the water is at the desired temperature.

Figure 9 is a section on the line 9—9 of Figure 8.

Figures 10, 11, and 12 are transverse sections on the lines 10—10, 11—11, and 12—12, respectively, of Figure 5.

Figure 13 is a sectional view through a valve device forming a part of the water supply system.

Figure 14 is a similar view of a nozzle which constitutes a part of said device.

Figure 15 is a similar view showing the elements of Figures 13 and 14 assembled, with the parts of the valve device in operated position, and Figures 16 and 17 are transverse sections on the lines 16—16 and 17—17, respectively, of Figure 15.

Figure 1:
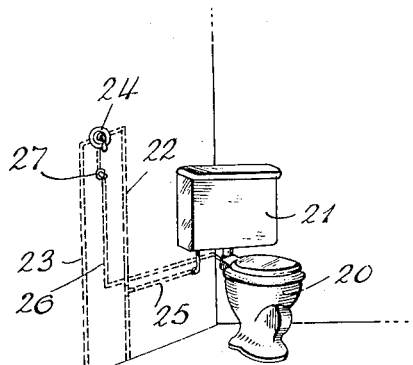
Figure 1 is a diagrammatic view, in perspective of a lavatory fixture and the supply system therefor.

In Figure 1, wherein there is shown so much of the water distribution system for the toilet bowl 20 and its supply tank 21 as is necessary to a complete understanding of the invention, the numerals 22 and 23 indicate, respectively, the cold and hot water pipes which are connected to suitable sources of supply. These pipes are joined at their upper ends to a mixing valve 24 of any conventional type, and the pipe 22 is also connected to the tank 21 by a branch pipe 25. A common supply pipe 26 into which the hot and cold water flows from the valve 24 extends from said valve to the bowl 20 where it is connected to the bidet. Interposed in said pipe 26 is a control valve, generally indicated by the numeral 27, which will be later described in detail, this valve being for the purpose of directing the water supply to the bidet or diverting the same to a douche apparatus (not shown) which a person may desire to employ which occupying the toilet seat.

Figure 2:
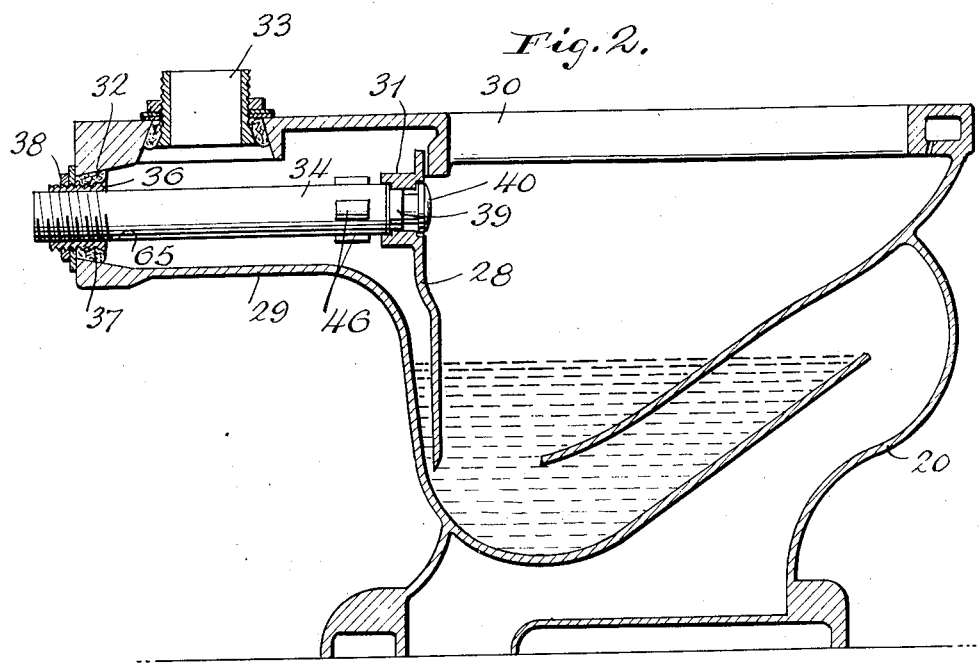
Figure 2 is a vertical section through a toilet bowl showing the bidet of the present invention in its inoperative position.
Figure 3:
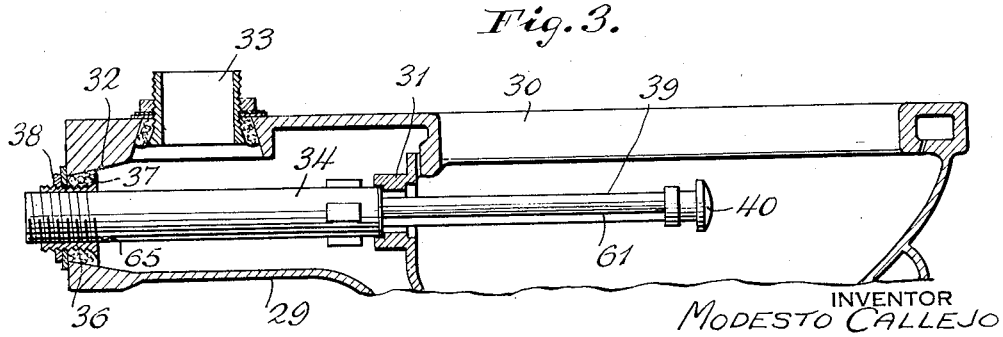
Figure 3 is a similar view with the bidet in its operative position.

As shown in Figures 2 and 3, the bowl 20 is of a standard construction except that it is provided in the wall 28 and the rearward extension 29, from which latter element the rim 30 extends, with the openings 31 and 32, respectively, in which the bidet of the present invention is mounted. The chamber formed by the extension 29 and the hollow rim 30 receive their water supply from the tank 21 through the connection 33.

The bidet of the present invention is shown in its preferred form as comprising a cylindrical body 34 one end of which is externally screw threaded as at 35 and adapted to be positioned in the opening 32 for connection to the adjacent end of the pipe 26. To support said end of the body 34 within said opening a threaded sleeve 36 is mounted upon said end and compresses between it and the wall of the opening a suitable packing 37. To hold the parts in place, a nut 38 is threaded upon the sleeve 36 and against the end of the extension 29. The opposite end of the body 34 is supported in the opening 31 and when the parts of the bidet are in their normal positions, as illustrated in Figure 2, the outer end of the nozzle 39 together with its head 40, is recessed within said opening, with the remainder of the nozzle contained in the body 34.

The inner end of the nozzle 39 has mounted thereon a piston 41 provided with suitable packing rings engageable with the inner wall of the body 34 to prevent leakage of the water supply past the piston, and in the center of the latter there is formed an opening 42 from which extends in the direction of the outer end of the nozzle an inner tubular member 43 closed at its outer end to prevent passage of the water supply through said opening 42 and into the nozzle. Connecting the outer end of the tubular member with a cross piece 44 secured in the inner end of the body 34, is a coil spring 45 which passes through the central opening 42 in the piston and operates to yieldably maintain the nozzle 39 in its normal or inoperative position and further acts to restore said nozzle to said position after the device has been operated.

As in my previous patent above referred to, the construction and operation of the bidet is such that when the water supply is turned on and admitted into the body 34 the pressure thereof acts against the piston 41 to force the nozzle 39 outwardly to its operative position shown in Figure 3 but the supply will not enter the nozzle 39 from said body until the former has actually reached said operative position. When in such position, as shown in Figures 4 and 5, the water supply will flow around and through the piston 41 and into the nozzle 39 through the plurality of by-passes 46 formed in the body 34. The outer ends of these by-passes register with an annular groove 47 formed about the piston 41 and communicating with said groove a number of openings 48 arranged diagonally in the piston and communicating with the space in the nozzle 39 which surrounds the member 43. Thus it will be seen that the water supply will flow into the nozzle as soon as the piston 41 reaches the outer end of the body 34 and the nozzle 39 is in its operative position.

At a suitable point adjacent the outer end of the nozzle 39 the same is provided in its interior with a valve seat structure consisting of the transversely disposed partitions 49, 50 and 51 all of which are disposed centrally of the nozzle to provide spaces on opposite sides thereof (see Figures 10 and 11) so that the water within the nozzle may flow past this valve seat structure and into the outer end of the nozzle. The partitions 49 and 50 combine to form a downwardly directed outlet 52 while the partitions 50 and 51 likewise form an upwardly directed outlet 53. A valve generally indicated by the numeral 54 is utilized to control the alternate opening and closing of the outlets 52 and 53 and for this purpose said valve is slidably mounted in the valve seat structure so as to be capable of moving through the partitions of said structure, the partition 49 having an opening 55 into which the adjacent end of the valve 54 may pass when the latter is operated from the position shown in Figure 4 to that illustrated in Figure 8. When in the former position which the valve assumes when the temperature of the water supply is below the desired degree, the free end of said valve closes at outlet 53 but permits the water in the nozzle to flow through the openings 55 and 56 in the partition 49, into the space between said partition and the partition 50 and from thence through the outlet 52 downwardly into the bowl 20. However, when the valve is operated to substantially the position of Figure 8 by an increase in the temperature of the water, as will presently appear, the free end of said valve will close the opening 55 and shut off any further flow through said opening and also the opening 56 into the outlet 52. At the same time, the reduced portion 57 of the valve 54 comes into alignment with the space between the partitions 50 and 51, whereupon the water supply will flow through the opening 58 formed in the latter partition and from thence the water will pass around the reduced portion 57 and upwardly through the outlet 53. During the course of operation should the temperature of the water rise above the desired degree, said valve 54 will continue to move in the same direction until the inner end of said valve closes the space between the partitions 50 and 51, thus shutting off the flow to the outlet 53. When the valve is in this position, its outer end has been projected through the opening 55 and the reduced portion 57 is then in alignment with the space between the partitions 49 and 50 so that the flow of water will again pass through the opening 56 and be discharged through the outlet 52.

In accordance with the present invention, a thermostatic device is utilized to control the operation of the valve 54. In its preferred form, this device is shown as comprising an expansible element 59 mounted in the outer end of the nozzle and directly connected at one end with the valve 54. Communicating with the interior of said element 59 at the opposite end thereof is an elongated tube 60 which extends longitudinally of the nozzle 39 to practically its entire length and is disposed in a channel or a groove 61 (see Figures 10 to 12) so as to be immersed in the water supply within the nozzle. The element 59 and tube 60 contain any suitable liquid which is readily responsive to variations in temperature so that when changes occur in the latter the element 59 will expand or contract in proportion to such changes so as to move the valve 54 back and forth in its seat. The outer end of the element 59 is engaged by a set screw 62 which is utilized to adjust said element for the purpose of securing variations in the range within which the valve 59 will accomplish the exhaust of the water supply through the outlet 53. Said screw 62 is mounted in a shell 63 which is threaded into the outer end of the nozzle 39 and which has a packing 64 interposed between it and the inner end of the head 40 which is threaded into such shell.

From the foregoing description it will be apparent that when the mixing valve 24 (Figure 1) is turned to admit hot and cold water into the pipe 26 the flow will pass into the body 34 and against the piston 41, thus forcing the nozzle outwardly from the position of Figure 2 toward that shown in Figure 3, this outward movement being against the tension of the spring 45.

When said piston reaches the extreme of its outward movement, the water will then flow through the by-passes 46 and through the piston into the nozzle. As this flow comes in contact with the tube 60, the inner end of which is disposed adjacent to piston, the liquid in said tube is affected by the temperature of the water and either expands or contracts so that a similar movement is imparted to the element 59, thus causing a shifting in the valve 54. If the temperature of the water is below the desired range, the element 59 will not expand sufficiently to move the valve so that the latter will shut off communication between the opening 56 and the outlet 52 and as a consequence the water supply will be discharged through the said outlet. On the other hand, if the temperature of the water is too high, the valve 54 will be moved to its extreme left hand position, as viewed in Figures 4 and 8, and the supply will still pass through the outlet 52, in this instance around the reduced portion 57 of said valve which will then be in alignment with the space between the partitions 49 and 50. Upon the water attaining the desired temperature the valve will, under the influence of the element 59 assume the position shown in Figure 8 whereupon the water will no longer be disposed through the outlet 52 but will be diverted through the opening 58 and from thence upwardly through the outlet 53. When the flow is shut off by a closing of the valve 24, the pressure upon the piston 41 will be relieved and the nozzle will, under the influence of the spring 45, be retracted into the body 34. As this movement progresses, the water remaining in the body 34 will be discharged into the extension 29 through the exhaust passage 65 formed in the wall of said body.

The valve device illustrated in Figures 13 to 17, inclusive, will now be described. This device, which has been generally indicated by the numeral 27, is interposed in the common supply pipe 26 and during the time when the bidet is in operation, the parts of the device 27 are so positioned as to permit of the free flow of the water supply through the pipe 26 to the bidet, this position of the parts being illustrated in Figure 13, as shown, the valve device comprising a body portion 66 having an inlet 67 and an outlet 68 to which sections of the pipe 26 are connected, and further having a second outlet 69. Between the various outlets the body 66 is provided with oppositely disposed valve seats 70 and 71 which are adapted to be engaged, respectively, by the valve sections 72 and 73. These sections are connected by a stem 74 which is surrounded by a coil spring 75 one end of which engages the valve seat 71 while the opposite end of said spring engages the valve section 72. The spring 75 operates to normally and yieldably maintain the section 72 out of engagement with its seat 70 so that the water flowing into the inlet 67 will pass through the valve device and out of the outlet 68. When in the position just described the valve section 73 engages its seat and prevents the flow of water through the opening 76 in the latter and into the outlet 69. The stem of 74 is provided at its right hand end with an extension 77 which engages in a recess formed in the plug 78 so as to guide the movements of the valve structure, and at the opposite end of said stem there is provided another extension 79 which projects into the outlet 69 and carries a transverse pin 80. This pin is utilized as a part of a mechanism for operating the valves 72 and 73 to divert the flow of water from the outlet 68 to the outlet 69.

When it is desired to employ the flow through the outlet 69, a nozzle 81 (Figure 14) is inserted into the outlet 69 and the act of inserting said nozzle into its position within said outlet is used to shift the positions of the valves 72 and 73 so as to close the seat 70 and open the seat 71. To this end, the nozzle 80 is provided therein with a curved slot 82 which is adapted to receive one end of the pin 80. When so engaged the nozzle is given a rotative movement whereupon the curvature of the slot acts to exert an outward pull upon the extension 79 and consequently the stem 74, which pull is against the tension of the spring 75. The valve structure is thus moved into the position shown in Figure 15 and the water supply is permitted to pass through the opening 76 and into the outlet 69. When the nozzle is in its operative position the outer end of the nozzle 69 is closed by a gasket 83 carried by the flanged head 84 of the nozzle. The body portion of the nozzle is provided with a series of outwardly converging passages 85 which communicate with a main duct 86. Interposed between said passages and duct is a rotary valve 87 adapted to normally close the outer ends of the passages 88 but which permits the flow to enter the duct 86 when the valve is turned. The outer end of the nozzle body 81 is adapted to receive a flexible tube 88 whereby the flow of the water may be conveyed to a desired point.

What is claimed is:

1. In combination, a bidet for toilet bowls comprising a nozzle, and means within said nozzle to permit the passage of water supply in one direction therefrom only when said supply has attained a predetermined temperature.

2. In combination, a bidet for toilet bowls comprising a nozzle, a valve for controlling the flow of water supply from said nozzle, and a thermostatic device in said nozzle for operating said valve.

3. In combination, a bidet for toilet bowls comprising a nozzle having two outlets, and means to direct the water supply for said nozzle to only one of said outlets until said supply has attained a predetermined temperature, said means being thereupon operable to close the latter outlet and open the other.

4. In combination, a bidet for toilet bowls comprising a nozzle having two outlets, a valve for alternately opening and closing said outlets, and a thermostatic device controlling said valve so that it will close one of said outlets until the water supply for the bidet reaches a predetermined temperature.

5. In combination, a bidet comprising a nozzle actuated, by the flow of water supply, from an inoperative to an operative position, means to prevent said flow from passing from said nozzle during the latter movement, and means thereafter operable to permit said flow to pass in one direction from said nozzle only when the water is at a predetermined temperature.

6. In combination, a bidet comprising a nozzle actuated, by the flow of water supply, from an inoperative to an operative position, means to prevent said flow from passing from said nozzle during the latter movement, and a thermostatically controlled valve for governing the passage of water from said nozzle after the latter has reached its operative position.

7. In combination, a bidet comprising a body, a nozzle movable relative thereto to operative and in operative positions, means to admit water supply to said nozzle only when the latter has reached its operative position, means operable, when said supply has attained a predetermined temperature, to permit it to pass from said nozzle in an upward direction, and means connecting said body and nozzle to restore the latter to its inoperative position upon cessation of the flow of said supply.

8. In combination, a bidet comprising a nozzle having opposed outlets, and further having a movement from an inoperative to an operative position, means actuated by the flow of water supply for the bidet to move said nozzle to its operative position, means to prevent said flow from entering said nozzle until its operative position is reached, and means to control the passage of said supply from said nozzle through only one of said outlets until said supply has reached a predetermined temperature, the latter means being thereupon operable to close the last named outlet and open the other.

9. In combination, a bidet comprising a body, a nozzle mounted for sliding movements therein to operative and inoperative positions, and having outlets, a valve seat structure adjacent said outlets, a valve movable in said structure and controlling, by such movement, the alternate opening and closing of said outlets, and an expansible element connected to said valve and immersed in the water supply in said nozzle so as to be affected by variations in the temperature of said supply to move said valve to a position wherein the supply will pass through one of said outlets only when said temperature is within a predetermined range.

10. In combination, a bidet comprising a body, a nozzle mounted for sliding movements therein to operative and inoperative positions, and having outlets, a valve seat structure adjacent said outlets, a valve movable in said structure and controlling, by such movement, the alternate opening and closing of said outlets, an expansible element connected to said valve and immersed in the water supply in said nozzle so as to be affected by variations in the temperature of said supply to move said valve to a position wherein the supply will pass through one of said outlets only when said temperature is within a predetermined range, and a pipe communicating with said expansible element and extending longitudinally of said nozzle.

11. In a water distribution system, a bidet, a supply pipe therefor, a valve device connected in said pipe and through which the water supply passes to said bidet, and a nozzle attachable to said valve device for operating the same to divert the flow of said supply from said bidet through said nozzle.

12. In a water distribution system, interconnected hot and cold water supply pipes, another pipe common thereto, a mixing valve for controlling the flow of hot and cold water into said common pipe, a valve device in said common pipe, a bidet connected to the latter pipe and receiving said supply therefrom through said valve device when the latter is in one position, and a nozzle for said valve device having means to operate the latter when said nozzle is attached thereto for diverting said supply from said bidet and through said nozzle.

13. A valve device comprising a body having two outlets, a valve operable to alternately open and close said outlets, spring means for normally maintaining said valve in one of its operative positions, a nozzle adapted for connection to the normally closed outlet, and cooperating means between said valve and nozzle operable when the latter is connected to the latter outlet to actuate said valve to its other operative position.

14. In combination, a bidet for toilet bowls comprising a nozzle having outlets, a valve within said nozzle for controlling said outlets, and a thermostatic device also in said nozzle for operating said valve.

15. In combination, a bidet comprising a body, a nozzle supported thereby for movements to operative and inoperative positions, and means to release the flow of water supply from said nozzle only when said supply has reached a predetermined temperature and said nozzle in its operative position.

MODESTO CALLEJO.